Aug. 29, 1961   J. H. FORKNER   2,998,318
METHOD OF MANUFACTURE OF A FILLED COOKIE
Filed Jan. 2, 1958   2 Sheets-Sheet 1
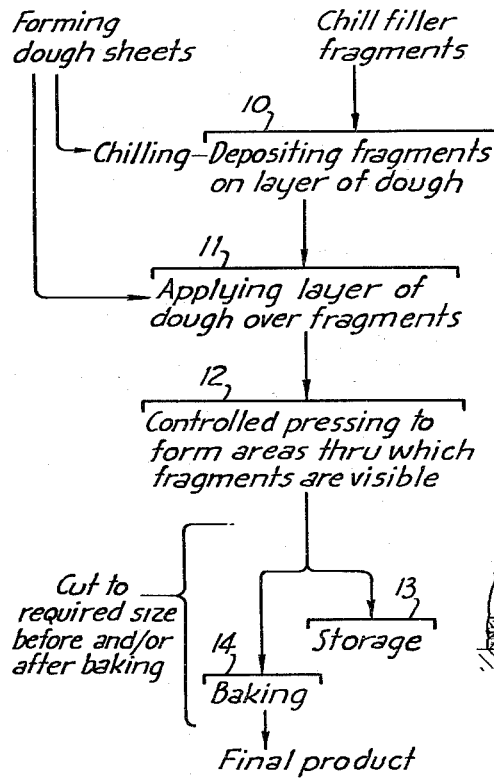
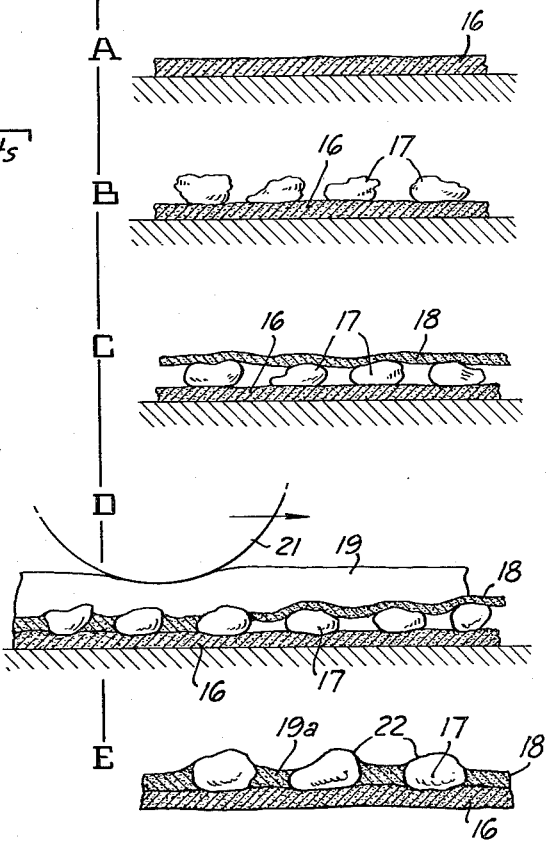
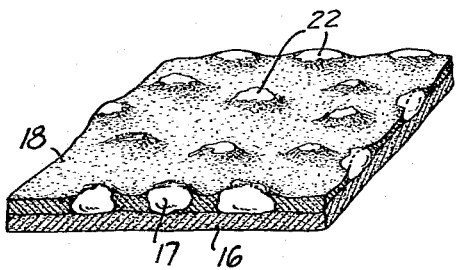
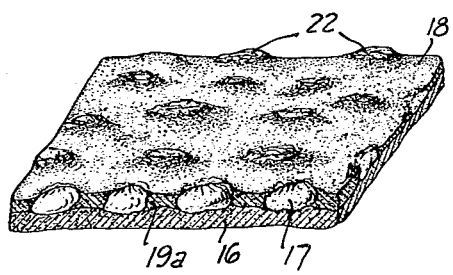
INVENTOR.
John H. Forkner
BY
ATTORNEYS

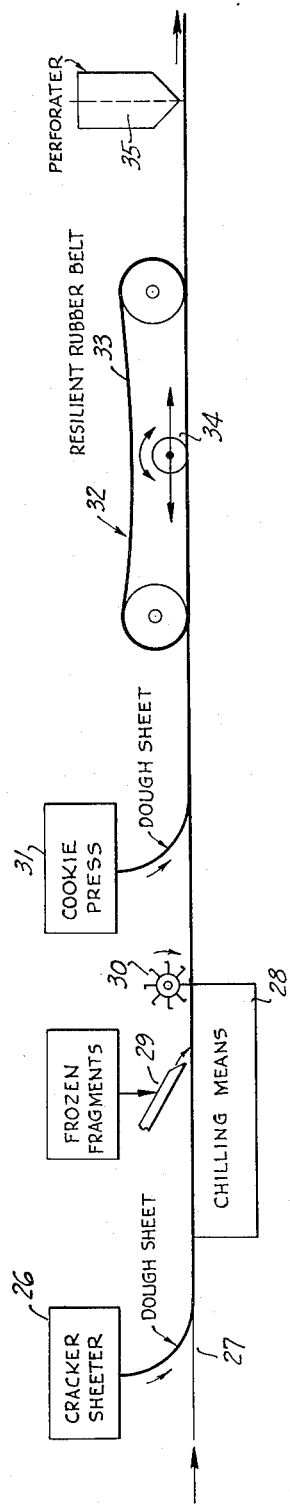

United States Patent Office 2,998,318
Patented Aug. 29, 1961

2,998,318
METHOD OF MANUFACTURE OF A FILLED
COOKIE
John Hood Forkner, Fresno, Calif., assignor to The Pillsbury Company, Minneapolis, Minn., a corporation of Delaware
Filed Jan. 2, 1958, Ser. No. 706,765
8 Claims. (Cl. 99—86)

This invention relates generally to food products and methods for manufacturing the same. More particularly the invention pertains to cookies of the filled type.

One conventional method for incorporating filler fragments like dried fruit, confections or nuts in cookies, is to mix the fragments in the dough mix, whereby when the dough is deposited in the pan, the fragments are indiscriminately distributed in the layer of dough. Some or all of the fragments may directly contact the hot pan, with resulting sticking and burning. Few, if any, of the fragments may be visible after baking. Another conventional method is to deposit unbaked cookies on a cookie sheet and then apply the fragments upon the same. This method directly exposes the fragments to the oven temperature, with resulting deterioration, and the bond between the fragments and the body portion of the cookie may be insufficient to prevent detachment.

In general it is an object of the present invention to provide a novel method for the manufacture of filled cookies.

Another object is to provide a method of the above character which results in a predetermined and optimum distribution of fragments or masses in the finished product, with areas of all or the major part of the fragments being visible through the top baked surface.

Another object is to provide a method of the above character in which filler fragments or masses are effectively bonded with the body of the cookie, while at the same time having an area of the same visible through one side thereof.

Another object is to provide a method of the above character involving the use of a plurality of layers or laminations of dough, with filler fragments being retained in a novel manner between the layers.

Another object is to provide a novel procedure for the manufacture of a multilayer or laminated cookie, which involves a special pressing operation whereby areas of a filler are made visible and the layers bonded together.

Another object is to provide a novel method of the above character making possible storage of the completed but unbaked cookie, with the filler fragments incorporated in a novel manner within the dough.

Another object is to provide a novel cookie prepared in accordance with the present method, including the prepared product before baking.

Another object is to provide a laminated cookie in which filler fragments are retained and supported in a cuplike wall of dough.

Another object is to provide a laminated cookie in which filler fragments protrude through the upper layer of dough but are protected by a dough film.

Additional objects and features of the invention will appear from the following description in which the preferred embodiments have been set forth in detail in conjunction with the accompanying drawing.

Referring to the drawing:

FIGURE 1 is a flow sheet illustrating a desirable procedure for carrying out the present invention.

FIGURES 2A–E illustrate the product in various stages of production.

FIGURE 3 illustrates the product incorporating the present invention before baking.

FIGURE 4 illustrates the same product after baking.

FIGURE 5 schematically illustrates a continuous method using the present invention.

The present invention involves the use of at least two relatively thin layers of dough that are combined together with filler masses or fragments, to form a waferlike cookie.

The procedure followed is such that areas of the fragments are made visible on the top side of the cookie, while at the same time being firmly retained by the layers or laminations of dough.

In accordance with the present invention I apply filler fragments or masses to a thin sheet or layer of cookie dough. The fragments should be relatively firm as compared to the second layer of dough that is subsequently applied. They are distributed upon the first layer of dough in such a manner as to leave intervening areas between the same. A second layer of dough is now applied over the distributed fragments, and controlled pressure is applied whereby areas are formed in regions overlying the fragments through which the fragments protrude and are visible. The assembly may now be baked in an oven, with or without intervening storage.

A more specific procedure can be described with reference to FIGURE 1 of the drawing. The filler fragments are indicated as having been chilled to make them relatively hard. With the materials hereinafter described it is desirable to chill to a temperature well below freezing, as for example, from 0° to 20° F.

Various types of cookie mixes can be employed for forming the dough sheets or layers. Preferably the dough used for the lower or bottom layer contains a leavening agent, such as baking soda. Conventional rolling devices can be used to produce a layer of the desired thickness. For the bottom layer a thickness of the order of from $\frac{1}{16}$ to $\frac{3}{16}$ of an inch is desirable, although in some instances greater thicknesses can be employed. The upper layer preferably is somewhat thinner and the batter from which it is formed contains less leavening agent than the mix for the lower layer, or such agent may be omitted. As will be presently explained, it is desirable that the upper layer be such that during baking, it does not rise sufficiently to provide a puffed apperance with a raised surface substantially above the general level of the filler fragments. With the leavening agent being omitted, or reduced to a minimum, the upper layer rises only a limited amount, whereby after baking the surface elevation is below that of the visible areas of the fragments. On the other hand the leavening agent contained in the lower layer of dough causes this layer to rise during baking. The rising action in this instance carries the filler fragments to a higher elevation, and forms a tender cookie base.

Step 10 represents the depositing of the filler fragments upon the lower layer of dough. Step 11 represents the application of the top layer of dough over the lower layer and the fragments. Step 12 represents the application of controlled pressure to form areas in the top layer through which the fragments are visible. At the time this pressure is applied the lower layer of dough should be of sufficient hardness to minimize penetration of the fragments into the same. In practice the desired degree of hardness can be obtained by chilling the lower layer of dough. Assuming that the fragments are at a temperature well below freezing, heat conducted to the fragments from the portions of the lower layer of dough immediately below the same serves to harden such underlying portions of the lower layer to the desired degree. I prefer to chill the lower layer of dough as by placing it upon a cold supporting surface, either before or during the time the fragments are being deposited.

As previously explained, the fragments are deposited in step 11 in such a manner as to leave areas between the same. For example, in typical instances the amount of fragments applied may cover from 35 to 70% of the total area of the lower layer.

The size of the fragments may vary in accordance with the appearance desired, and their character. In general they should have a thickness substantially greater than the thickness of the upper layer of dough. Assuming for example that the upper layer of dough has a thickness of the order of from 1/16 to 3/16 of an inch, the fragments may range from 1/4 to 5/8 of an inch in thickness.

The controlled pressing in step 12 can be carried out in various ways. One procedure which can be used is to apply a relatively soft sheet of resilient material (e.g. resilient rubber) on top of the upper layer, and then apply a pressing roller (e.g. rolling pin) over the top of the sheet. Another procedure is to employ a soft yieldable roller (e.g. resilient rubber), and apply it directly to the top layer. Such controlled pressing serves to squeeze the upper layer of dough into the areas between the hard fragments, to thereby establish a bond between the upper and lower layers. In areas directly overlying the particles, the dough is squeezed to film thickness, whereby areas are formed through which the fragments are visible. The use of yieldable or resilient means for applying pressure serves to distribute the pressure over fragments varying considerably in size, whereas nonresilient means such as a hard roller applies pressure mainly to the larger fragments. Also yieldable means effectively presses the dough down between the fragments.

Depending somewhat upon the character of the fragments, it may be desirable to perforate the upper layer of dough to facilitate escape of gas during baking.

After being formed in the manner described above, the assembly is subjected to baking at 14, with or without intervening storage 13 under refrigeration. The sheets from step 12 can be cut to the required size before and/or after baking.

FIGURES 2A–E show various stages in the method described above. FIGURE 2A illustrates the bottom layer of dough 16 ready for receiving the fragments. FIGURE 2B shows the fragments 17 after being deposited upon the bottom layer. FIGURE 2C shows the top layer 18 applied upon top of the fragments.

FIGURE 2D illustrates the operation 12 of FIGURE 1. The resilient rubber sheet 19 is shown placed upon the top layer 18, and the sheet is being pressed downwardly by the roller 21. After the controlled pressing operation the product appears as in FIGURE 2E. In areas 22 the top layer of dough has been reduced to a relatively thin film. The top layer has been squeezed into the spaces between the fragments, as indicated at 19a, and in addition it has been pressed into adhering contact with the bottom layer. Preferably the portion 19a has a thickness less than the thickness of the fragments, whereby the fragments protrude.

FIGURE 3 illustrates the top of the product after the controlled pressing operation. Note that the fragments protrude upwardly a substantial amount from the intervening dough, and the upper surfaces of the fragments are plainly visible.

With reference to FIGURE 2E, it will be noted that the fragments are in effect retained within cups or craters, whereby they are firmly retained within the dough before and after baking.

FIGURE 4 illustrates the product of FIGURE 3 after baking. The appearance is somewhat similar, although the lower layer of dough has become substantially thicker because of its contained leavening agent.

Various types of fillers can be employed, including dried or partially dehydrated fruits, candied fruit and berries, chopped nuts, confectionery pieces including "chocolate chips," and flavored products of the type disclosed and claimed in my copending application Serial No. 659,517, filed May 16, 1957. Also I can employ various jams and jellies in the form of frozen particles or fragments of proper size.

As an example of dried or partially dehydrated fruit, reference can be made to a dried fruit like raisins, which can be soaked for about two hours in warm water, to tenderize and increase the moisture content. Slow agitation is applied during freezing to prevent the individual raisins from clinging together.

As examples of candied fruits, reference can be made to chopped cherries, citrus peel, pineapple, and citron. Such fragments may have a moisture content of about 25 to 30%, and a size such that they pass through a 1/2 inch screen and remain on a 1/4 inch screen. Various types of chopped nuts can be employed, such as brazil nuts, walnuts, and the like. The particle size can be such that the fragments pass through a 1/2 inch screen, and remain on a 1/4 inch screen. Assuming that the nuts have been dried, it may be desirable to effect some moisture absorption by soaking the nuts in water before they are frozen.

The chocolate chips (i.e. confectionery drops) can be the same as is used in the bakery trade. Other confectionery pieces which can be employed include gum drops, or gum drop fragments, having a moisture content of about 28%, and a size which will pass through a 5/8 inch screen and remain on a 3/8 inch screen. The gum drop mix can be frozen and cracked to size. The use of such fragments provides soft confection particles in the finished cookie.

Hardening by chilling or freezing is required for all products which are too soft for the operation 12. However, some usable fragments may have sufficient hardness to permit use at room temperature.

Specific examples of the present invention are as follows.

*Example 1*

Dried raisins were soaked for two hours in warm water, and then frozen to 0° F. with agitation to maintain the particles separate. A cookie mix was prepared from ingredients as follows:

48 oz. cake flour
46 1/2 oz. granulated sugar (sucrose)
16 oz. whole eggs
32 oz. shortening
2 oz. liquid corn syrup
1 oz. salt
1 oz. baking soda
Plus vanilla flavoring The dough was formed into a sheet about 1/8 inch thick. This sheet was then chilled to 40° F., whereby it resisted penetration, while being sufficiently pliant to prevent ready cracking. A second dough was prepared with the same formula but without baking soda, to provide a dough of proper consistency for extrusion in a thin sheet. This dough was extruded to provide a sheet having a thickness of about 1/16 of an inch. While the chilled first layer of dough was being supported on a horizontal surface, the frozen raisins were deposited upon the same, and distributed to provide intervening areas as previously described. The number of applied raisins was such that they covered about 50% of the total surface area of the bottom layer. A top thin layer of dough, at room temperature, was then applied over the top of the frozen raisins. A resilient sheet of soft yieldable rubber 1/4 of an inch thick was laid upon top of the upper layer and pressure applied with a rolling pin. Thereafter the product appeared substantially as illustrated in FIGURES 2E and 3. The upper surfaces of the raisins were plainly visible in the areas 22. The dough portions 19a were relatively thinner than the fragments, whereby the fragments protruded upwardly. Strips of this product were subjected to conventional baking to produce a final baked product substantially as illustrated in FIGURE 4.

Example 2

The same procedure was followed as in Example 1, except that the lower layer of dough was at room temperature, and frozen fragments of candied pineapple applied to the same. The fragments were permitted to rest upon the lower layer for about one minute before the top layer was applied. During this period sufficient heat was conducted from the lower layer to make it relatively hard, thus preventing substantial penetration.

Example 3

The same procedure was followed as in Example 1, except that the fragments employed were citron having a moisture content of 25%, and chilled to a temperature of about 0° F. The citron was of such a size as to pass through a ½ inch screen and remain upon a ¼ inch screen.

Example 4

The same procedure was followed as in Example 1, except that the fragments employed were chopped walnuts sized to pass through a ½ inch screen and to remain on a ¼ inch screen. The nuts were first soaked in water at a temperature of 180° F. for a period of 30 minutes. Thereafter the nuts were frozen by chilling to a temperature of about 0° F.

Example 5

The same procedure was followed as in Example 1, except that the fragments were chocolate chips (i.e. confectionery drops). These chips were hardened by chilling to a temperature of about 0° F.

Example 6

The same procedure was followed as in Example 1, except that the fragments were confectionery gum drops having a gelatin base, and containing 28% moisture. The fragments were sized to pass through a ⅝ inch screen, and to remain on a ⅜ inch screen. They were hardened by chilling to 0° F.

Example 7

The same procedure was followed as in Example 1, except that the fragments were frozen strawberry jam with added pectin.

Example 8

A product was prepared in accordance with Example 1 of my aforesaid copending application Serial 659,517. Specifically, a mix was prepared from ingredients as follows:

12 lbs. corn syrup
3 lbs. malt syrup
10 gms. artificial yellow coloring
7/10 gm. artificial red coloring
1½ lbs. coconut stabilizer
4 lbs. powdered skim milk
3 lbs. pre-gelatinzed starch [1]
4 lbs. malted milk powdered The moisture content was about 5%.

[1] Instant Starch P23 made by National Starch Co.

Sized masses obtained in accordance with the foregoing procedure were relatively hard and did not require freezing before depositing upon the bottom layer of dough. Such masses were used in the same manner as outlined in Example 1, to produce cookies which when baked provided a final product having the characteristics previously described except for the difference in the nature of the fragments.

Additional variations within the spirit of the present invention will be apparent to those skilled in the art. For example, two or more different types of fragments can be employed for the same product, and various colors can be employed to enhance attractiveness. The fragments can be shaped either indiscriminately, or formed to predetermined contours.

This invention lends itself to large scale commercial manufacture and distribution. In some instances establishments using the invention may make the finished baked cookies, and distribute them to the trade in cartons, bags, or the like. In other instances the product may be manufactured in unbaked form and distributed as a refrigerated product, to be baked by the consumer.

FIGURE 5 illustrates a continuous commercial method making use of my invention. The cracker sheeter 26 delivers a thin continuous dough sheet to the continually moving conveyor 27. The conveyor passes over refrigerated means 28 whereby it is chilled to chill the dough sheet. The vibrating discharge means 29 delivers the filler fragments on top of the dough sheet, and the rotary spreader 30 distributes the fragments to provide proper spacing. A cookie press 31 continuously extrudes a second dough sheet which is deposited over the fragments, after which the two dough sheets and the intervening fragments pass to the pressing means 32. The pressing means as schematically illustrated consists of an endless belt 33 formed of resilient material like soft rubber and having its lower run resting on the top sheet of dough. A pressing roller 34 is disposed to press upon the lower run of the conveyor 33 and means is provided to cyclically oscillate this roller within the limits indicated, whereby there is a kneading action upon the dough. Thereafter the compressed composite sheet is perforated as it advances below the perforator 35.

Instead of depositing a single sheet of dough from the press 31, several strips of dough can be deposited side by side, with or without some spacing between the strips.

I claim:

1. A method for the manufacture of a filled cookie comprising: depositing filler fragments on the upper surface of a first layer of dough in spaced apart relation to expose substantial areas of said first layer of dough therebetween; applying a second layer of dough, softer than said first layer and of a thickness less than the height of said fragments, over the first layer and over the fragments; and then pressing the entire area of the second layer against the fragments and the first layer to squeeze the dough of said second layer into the spaces between the fragments and against said first layer and to form areas in said second layer through which the fragments are visible, said filler fragments being relatively firm compared to said second layer of dough.

2. A method as in claim 1 wherein said fragments cover from about 35% to 70% of the total surface area of said first layer.

3. A method as in claim 1 in which the first layer of dough is hardened by chilling the same, before the fragments are applied.

4. A method as in claim 1 in which the fragments are hardened by chilling before said second layer is applied.

5. A method as in claim 1 in which both the first layer of dough and the fragments are hardened by chilling before said second layer is applied.

6. A method as in claim 1 in which the first layer of dough contains a leavening agent.

7. A method as in claim 1 in which the pressing step is carried out by applying yieldable resilient means to the outer surface of the second layer and by applying mechanical force through said resilient means.

8. A method as in claim 1 in which the first layer of dough contains a leavening agent, and the second layer is substantially devoid of leavening agent.

References Cited in the file of this patent

UNITED STATES PATENTS 2,121,128    Loose et al. _____ June 21, 1938

OTHER REFERENCES

"Culinary Arts Institute Encyclopedic Cookbook," 1948, by Berolzheimer, published by Culinary Arts Institute (Chicago), pp. 745 and 759.